H. M. EDMUNDS.
MEASUREMENT OF THE FLOW OF GAS IN CONDUITS OR PIPES.
APPLICATION FILED NOV. 13, 1913.
1,148,833.
Patented Aug. 3, 1915.
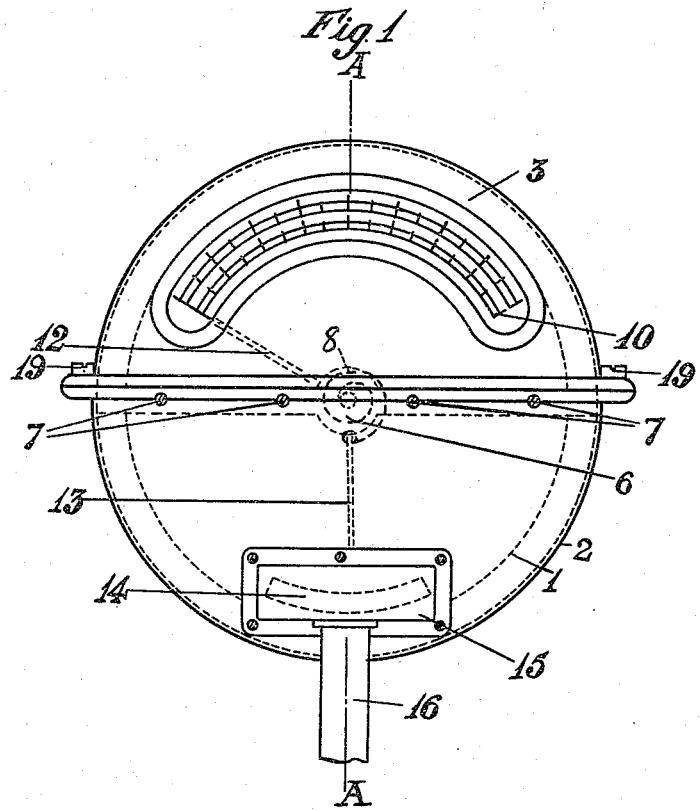
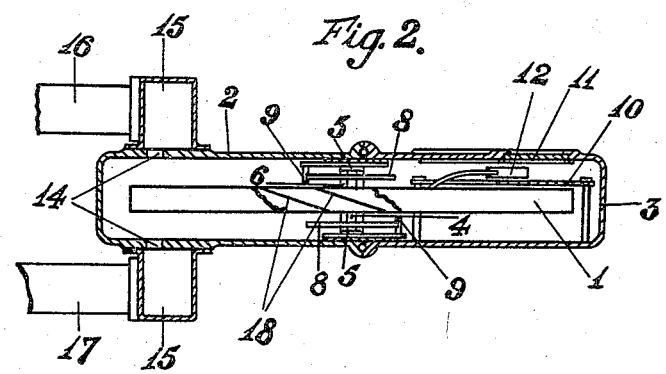
Witnesses
E. J. Marshall
J. J. White
Inventor
Howard M. Edmunds,
By John H. Holt
his Attorney.

UNITED STATES PATENT OFFICE.

HOWARD M. EDMUNDS, OF WESTMINSTER, ENGLAND.

MEASUREMENT OF THE FLOW OF GAS IN CONDUITS OR PIPES.

1,148,833.  Specification of Letters Patent.  Patented Aug. 3, 1915.

Application filed November 13, 1913. Serial No. 800,782.

*To all whom it may concern:*

Be it known that I, HOWARD MAURICE EDMUNDS, a subject of the King of Great Britain and Ireland, residing at Westminster, England, have invented new and useful Improvements in or in Connection with the Measurement of the Flow of Gas in Conduits or Pipes, of which the following is a specification.

This invention has reference to the measurement of the flow of gas in conduits or pipes, and has for its object to provide a simple and efficient measuring instrument whereby an indication of the rate of flow of the gas may be obtained.

As in many known measuring instruments, the measuring instrument in accordance with this invention and as hereafter described, comprises or contains one member or part that is, when the instrument is in use, subject to two influences which are in opposition; the one influence is due to the action of the gas or other medium to be measured on the member or part and the other influence to a controlling spring, weight or other force. The alteration in value of one of the two influences acting on the member or part causes movement thereof and such movement is utilized, either directly or indirectly, to give an indication, the indication so given or made depending on the particular measurement desired.

Now in measuring instruments of the type mentioned comprising the invention and for the purpose specified, the member or part mentioned is in the form of a circular disk or wheel, the periphery of which is provided with a plurality of blades or vanes. The disk or wheel is contained and is rotatably mounted within a casing, and such casing is inserted in the conduit or pipe, the rate of flow of gas through which it is desired to ascertain. The disk or wheel, is, in accordance with this invention, so arranged that only the blades or vanes at one part of the periphery thereof extend transversely of or across the bore of the conduit or pipe. The gas as it flows along the conduit or pipe, acts on the blades or vanes and it has a tendency to set the disk or wheel in rotation. This tendency or action of the stream or flow of gas is opposesd by a spring, weight or other force which is also arranged to act on the disk or wheel. The controlling force just mentioned is such that it tends to hold the disk or wheel in one position, and to return it always to such position when moved therefrom. The flow of gas across the blades or vanes is, in accordance with this invention, localized at one part of the periphery and, in consequence, the torque or turning effort acting on the disk or wheel is increased beyond that obtainable when the flow is uniformly disposed about the center of the disk or wheel. Furthermore, as only the vanes or blades at one part of the periphery of the disk or wheel, pass or extend across the conduit or pipe, any lack of uniformity of flow will be automatically avoided and the average indicated.

The disk or wheel may carry a pointer, such pointer being movable in relation to a scale or dial suitably marked. The blades or vanes on the periphery of the disk or wheel are mounted and disposed thereon in any convenient manner and in suchwise that the planes of the faces of the blades or vanes are at an angle or inclined to the direction of the flow of the gas.

At the part at which the blades or vanes pass across the bore of the conduit or pipe, the conduit or pipe is so constructed that the delivery of gas to, and exit from, the blades or vanes is effected without undue disturbing influences on the flow of the gas being introduced. Preferably, to effect this, the ends of the conduit or pipe connecting with the casing, or parts thereof, will be slightly out of line.

One mode of carrying this invention into practical effect is illustrated, more or less diagrammatically, on the accompanying sheet of drawings.

Figure 1 is a plan view and Fig. 2 is a sectional elevation on the line A—A of Fig. 1.

1 is the disk or wheel the periphery of which is provided with a plurality of blades or vanes 18. The disk or wheel 1 is preferably so mounted as to rotate in a horizontal plane and is contained within a two-part casing 2, 3 which is connected in the conduit or pipe line, the rate of flow of gas through which it is desired to ascertain. 4 is the spindle carrying the disk or wheel 1. The spindle 4 is carried in suitable bearings 5 secured to one or other of the parts 2, 3 of the casing. In the example illustrated, a rectangular framework 6 fits within the mouth of the part 2 of the casing and the bearings 5 are secured to such framework. The framework is secured to the part 2, as by means of screws 7.

The blades or vanes 18 in the disk or wheel 1 extend transversely to the path of the gas as in known types of measuring instruments and the gas, as it flows through the instrument, tends to set the disk or wheel in rotation. This tendency is opposed by two coiled controlling springs 8 of the usual type. The springs are arranged to act the one in opposition to the other so that the disk or wheel 1 tends always to return to the same initial position and temperature errors are compensated. The inner ends of the springs are connected to the spindle 4 and their outer ends are connected to projections 9 carried by the framework 6. The projections 9 may be movable, in which case the zero of the instrument will be adjustable.

10 is a piece of cardboard, enameled porcelain, or the like on which are marked one or more scales. Two scales are illustrated in Fig. 1, one for low readings and the other for high readings. The scale board 10 is suitably supported in the part 3 of the casing and a window 11 is provided to enable the scales to be seen. The scales extend over 120° in the instrument illustrated in the drawing and two pointers are provided subtending 120° at the spindle. The pointer 12 is for the lower scale and indicates low readings and the pointer 13 is for the upper scale and indicates high readings. When the pointer 12 passes off its scale, the pointer 13 commences to indicate on its scale. Of course, only one scale and one pointer may be provided if preferred or the instrument could be provided with more than two. The flow of gas across the blades or vanes 18 is localized at one part of the periphery and for this purpose a slot 14 is provided in both sides of the part 2 of the casing.

15 are boxes secured to the casing above and below the slots 14. The inlet and outlet pipes 16 and 17 respectively, are connected to the boxes 15, and the boxes 15 should, preferably, be large in comparison with the size of the slots 14 as this tends to give greater uniformity of flow across the blades or vanes. The slots 14 should, preferably, have the form of part of an annulus, but if the total length of the slot is short in comparison with the radius of the disk or wheel, they may be rectangular in shape. It is important that the maximum difference between the greatest and smallest radius (from the disk or wheel center) of the slots 14 should be small in comparison with the effective radius of the disk or wheel. If, for example, the radial width of the slot exceeded one half of the extreme radius of the disk or wheel, irregularities of flow in the slot would cause inaccuracies in the reading of the instrument. In the arrangement illustrated, there is a change in the direction of the flow of the gas as it enters and leaves the casing but, as will be obvious, such change of direction of flow may be avoided by suitable disposition of the pipes 16, 17. By the use of slots 14 as described, the flow of gas across the blades or vanes of the disk or wheel, is localized at one part of the periphery of the disk or wheel, and any lack of uniformity of flow of the gas is automatically balanced and the average indicated.

The parts 2, 3 of the casing are secured together by screws 19 and the joint between these parts is made gas-tight in any known manner.

What I claim is:—

1. In an instrument for measuring the rate of the flow of gas, having a body provided with a series of vanes and angularly movable in opposition to a controlling force by the gas the flow of which is to be measured, gas conducting means having an opening for the delivery of the gas against the face of said vanes, and gas conducting means having an opening arranged to receive the gas passing from said vanes and on the opposite side thereof from the first mentioned opening, both said openings being of lesser width measured radially of said body than the radial width of the vanes and adjacent a part only of the periphery of said body, to localize the flow of gas across said vanes.

2. In an instrument for measuring the rate of the flow of gas, having a body provided with a series of vanes and angularly movable in opposition to a controlling force by the gas the flow of which is to be measured, a casing in which said body is mounted provided with elongated slot openings for the entrance and exit of the gas to and from said casing, said openings being located adjacent the path of said vanes and on opposite sides of said vanes and so located relatively thereto that a portion only of said vanes extends transversely across said openings, whereby the passage of gas across said vanes is localized within a space measured radially of said vanes small as compared to that of the radial width of the vanes themselves, said opening being elongated circumferentially to cause the gas to impinge on more than one of said vanes simultaneously, but limited in length to confine the gas to a portion only of said body measured circumferentially thereof.

Dated this 1st day of November, 1913.

HOWARD M. EDMUNDS.

Witnesses:
TRACY LAY,
HERBERT D. JAMESON.